United States Patent Office 3,226,188
Patented Dec. 28, 1965

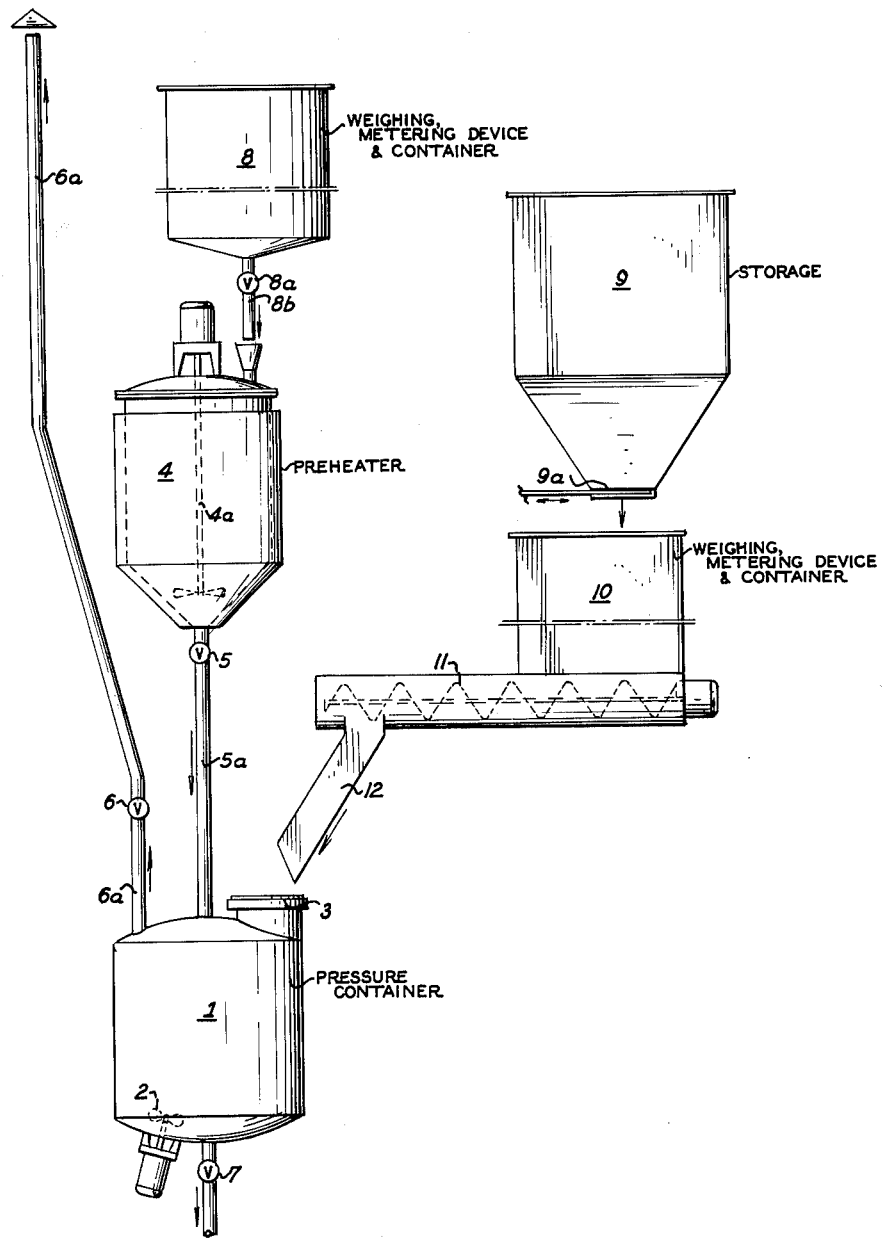

3,226,188
PROCESS FOR THE PRODUCTION OF ALUMINUM SULFATE MELT
Hermann Rüter, Ludwigshafen (Rhine), and Egon Cherdron and Fritz Fässle, Limburgerhof, Pfalz, Germany, assignors to Gebruder Giulini G.m.b.H., a German corporation
Filed Oct. 10, 1961, Ser. No. 144,117
Claims priority, application Germany, Oct. 29, 1960, G 30,819
6 Claims. (Cl. 23—123)

The present invention relates to a process for the production of aluminum sulfate melt, and more particularly to such a melt having a content of from about 14 to 20% by weight of $Al_2O_3$ by the reaction under pressure of aluminum hydroxide with sulfuric acid, the sulfuric acid having a concentration corresponding to that required for achieving the desired $Al_2O_3$ content in the produced aluminum sulfate melt.

Heretofore, the production of aluminum sulfate was carried out on an industrial scale by dissolving aluminum hydroxide and/or bauxite portion-wise in dilute sulfuric acid with the application of heat. The reaction of the aluminum hydroxide and dilute sulfuric acid was usually carried out in open heatable containers. The termination of the dissolution process, and accordingly the end of the introduction of aluminum hydroxide and/or bauxite must be determined by continuous analytical tests of the reaction mixture. The accumulating aluminum sulfate melt resulting from the reaction contains less than 14% by weight of $Al_2O_3$. Such melt must be concentrated by evaporation in order to obtain a commercial product having the desired content of above 16%, and preferably 17–18% by weight of $Al_2O_3$.

In accordance with Italian Patent 364,668, a process for producing aluminum sulfate is suggested, according to which sulfuric acid is used in such concentration that in dependence upon the water content present in the aluminum hydroxide, a product with 17–21% by weight of $Al_2O_3$ is obtained. The conversion of the base and acid is carried out in a pressure container which preferably takes the form of a mixing drum rotating about a horizontal axis. Upon the filling of the drum with aluminum hydroxide, the drum is sealed and rotation is initiated. Thereafter, sulfuric acid is pumped into the container by means of an adjustable centrifugal pump whereupon a temperature increase occurs within the drum due to the exothermic reaction taking place. The rate of introduction of the sulfuric acid into the drum is controlled such that the temperature within the drum will remain between 145 and 160 degrees C. The regulation of the temperature within the drum may also take place in consequence of the loss of radiation heat through the drum walls, whereby the temperature decline will be accelerated.

The main advantage of this reference process is due to the fact that the costs for the concentration by evaporation of the aluminum sulfate melt are apportioned to the $Al_2O_3$ content in the commercial product desired.

Nevertheless, the aluminum sulfate produced in a sealed rotating drum does not approach the characteristics of aluminum sulfate as produced in open heatable containers in accordance with the classic process. Above all, the content of insoluble materials is substantially higher while the ratio is reflected in terms of $Al_2O_3:SO_3$, the degree of basicity being accordingly difficult to maintain. The rotating drum procedure is furthermore not dependable enough since frequently the mass within the rotating pressure drum solidifies before the total quantity of sulfuric acid has been introduced. This phenomenon occurs because of the shortage of acid existing in the reaction mixture at this stage whereby at the high temperature present, i.e. 145–160 degrees C., basic aluminum sulfates of changeable composition very readily crystallize out. Accordingly, the reaction mass will solidify prematurely rendering this process undesirable for producing aluminum sulfate on an industrial scale.

It is an object of the present invention to overcome the foregoing drawbacks and to provide a process for the production of aluminum sulfate melt having a content of from about 14–20% by weight of $Al_2O_3$ by the reaction under pressure of aluminum hydroxide and sulfuric acid having a concentration corresponding to that required for producing the desired $Al_2O_3$ content in the produced aluminum sulfate melt.

It is another object of the present invention to provide such a process wherein the aluminum hydroxide and sulfuric acid are intensively completely inter-mixed prior to the setting in of the acid-base reaction, such that the subsequent reaction may be effected while continuing the intensive intermixing.

Other and further objects of the invention will become apparent from a study of the within specification and accompanying drawing, in which the figure schematically illustrates one form of apparatus for carrying out the process of the invention.

It has been found, in accordance with the present invention that a more effective process for the production of aluminum sulfate melt, having a content of from about 14–20% by weight of $Al_2O_3$ may be provided by the reaction under pressure of aluminum hydroxide with sulfuric acid having a concentration corresponding to that required for producing the desired $Al_2O_3$ content in the produced aluminum sulfate melt. Specifically, the process comprises intensively completely inter-mixing the aluminum hydroxide with the sulfuric acid prior to setting in of the acid-base reaction, and thereafter carrying out the reaction of the mixture of aluminum hydroxide and sulfuric acid while maintaining the temperature of the reaction mixture within the range of from about 150–200 degrees C. The intensive intermixing of the ingredients is continued, preferably, throughout the reaction period.

In accordance with one embodiment of the invention, the intensive intermixing is continued throughout the reaction and is carried out for a period of at most 60 minutes duration. The sulfuric acid being mixed with the aluminum hydroxide is added thereto at a temperature preferably between about 30–50 degrees C. while the intensive intermixing is carried out for a period of at most about 30 minutes. With respect to this specific embodiment of the invention, the temperature of the reaction mixture is suitably maintained between 165 and 180 degrees C. during the reaction period. A most advantageous form of the invention contemplates the addition of the sulfuric acid as quickly as possible, and preferably over a period of from about 30–120 seconds whereupon the reaction with the aluminum hydroxide is initiated after about 60–300 seconds of intensive intermixing of the added acid therewith, the intensive intermixing being carried out for an additional period of at most about 10 minutes until the reaction is completed.

It will be appreciated that where desired, at least a portion of the aluminum hydroxide may be replaced by finely ground bauxite.

Advantageously, in accordance with the present invention, by carrying out the process in the manner above described in an autoclave or other pressure container an aluminum sulfate melt having the desired $Al_2O_3$ content and desired alkalinity will be achieved depending upon the concentration of the sulfuric acid. The content of insoluble materials in the melt, of course, will be considerably lower than the insoluble content usually found in aluminum sulfate melts produced in the conventional manner.

It will be appreciated that the desired $Al_2O_3$-content in the end product depends upon the water content of the sulfuric acid and the water content of the aluminum hydroxide and/or bauxite employed. Depending upon the water content of the aluminum hydroxide, therefore, the concentration of the sulfuric acid used must be appropriately adjusted so that the water content in the finally produced melt will be desirably low. Before mixing of the ingredients, upon ascertaining the water content of the aluminum hydroxide, the concentration of the sulfuric acid may be calculated whereby the final amount of water in the melt will be suitably obtained. Naturally, where aluminum hydroxide is used in dry form, the acid concentration will be adjusted by correspondingly diluting more strongly concentrated sulfuric acid to obtain the desired amount of water in the final product.

While a particular ratio of $Al_2O_3$ to $SO_3$ is conventionally used for preparing aluminum sulfate melts, where pure aluminum hydroxide is employed any insoluble portions in the finished melt are, of course, generally undesirable since these represent a loss of $Al_2O_3$ and besides may manifest disturbances in the various intended uses of the material. With respect to the employment of bauxite rather than pure aluminum hydroxide, the amount of insoluble constituents depends upon the quantity of non-decomposable constituents present in the bauxite. Where the aluminum sulfate is to be used in the paper industry, leather industry, or in water-treatment applications, the material should be completely soluble and free from disturbing insoluble constituents.

The advantages of the present invention are achieved due to the fact that the mixing of the aluminum hydroxide and/or bauxite with dilute sulfuric acid takes place so quickly that a reaction of both components during the mixing does not yet begin. Moreover, the mixing of the components and the stirring of the reaction mass in the autoclave or pressure container is effected with a high speed stirrer imparting a very vigorous and turbulent motion to both the undissolved portions as well as the already dissolved portions in the reaction mixture. A viscous liquid mass is formed in this manner such that the stirrer must be in a position to disperse the intermixed materials and nullify the formation of lumps and aggregates in the reaction mixture. Due to the requirement for vigorous and turbulent intermixing of the reactants, a rotating pressure sealed drum, such as is disclosed in Italian Patent 364,668 is unsuitable for this purpose.

In consequence of the extremely rapid introduction of the dilute sulfuric acid to the aluminum hydroxide and the vigorous turbulent stirring of the reaction mass, the temperature at which the reaction sets in is only subsequently reached. In order to ensure the desired conditions, the temperature of the acid being added is controlled such that a temperature of 150–200 degrees C., and preferably 165–180 degrees C. is maintained during the decomposition reaction. In consideration of the loss of heat by radiation from the mixing container in conjunction with the reaction heat generated, the temperature of the acid which is added may be suitably between 35 and 50 degrees C.

In order to avoid the otherwise occurence of hydrolysis of the aluminum sulfate so as to produce insoluble basic aluminum sulfate as well as a correspondingly more strongly acid sulfate melt, the stirring time is not extended beyond one hour, and desirably not beyond 30 minutes duration.

It will be appreciated that the rate at which the sulfuric acid is mixed with the aluminum hydroxide and/or ground bauxite depends upon several factors. In any case, the mixing must be completed prior to initiation of any reaction between the components with one another, which initiation is manifested by a temperature rise of the mixture. The reaction speed of the two components depends upon various factors. First, the speed depends upon the temperature of the acid, since it will be appreciated that the higher the temperature of the acid, the faster will be the initiaion of the reaction. Secondly, the reaction speed depends upon the concentration of the acid, more dilute solutions being able to take up larger amounts of heat. Furthermore, the reaction speed depends upon the reactivity of the alumina-raw material, since the finer the aluminum hydroxide and/or bauxite used, the more rapidly will the reaction mixture react.

The aluminum hydroxide normally employed is moist aluminum hydroxide in the form in which it precipitates in alumina-producing processes, i.e. having a moisture content of 12–20% and a water of hydration content of about 35.5% based upon the dry material.

Therefore, the prior art difficulties may be avoided by endeavoring to complete the combining and admixing of the two ingredients in the shortest possible time and preferably within 30 seconds. Once the two ingredients have been combined, then the reaction components may be thoroughly agitated by stirring or the like so that the reaction may be initiated and completed in the shortest possible time. The mixture will be agitated preferably until all soluble constituents have been dissolved and the mass has completely finished reacting.

Accordingly, as noted above, a reaction temperature of 150–200 degrees C., and preferably 165–180 degrees C. sets in during the reaction within the reaction vessel, the pressure within the vessel or autoclave reaching about 3 to 10 atmospheres excess pressure. For best results, the speed of rotation of the stirrer depends upon the size of the container and the shape of the stirrer itself, and for example a propeller-stirrer may be used having a blade diameter of 280 mm. where the autoclave has a volume content of 3 cu. meters, such that a speed of rotation of the stirrer of 900 revolutions per minute is possible in order to effect complete dissolution as desired. Of course, in larger autoclaves, correspondingly larger stirrers with increase mixing intensity must be used.

Referring to the drawing, an acid-resistant pressure container or autoclave 1, which is equipped with a high speed stirrer 2 on its bottom wall, is filled with aluminum hydroxide through the inlet opening 3. The inlet opening 3 is provided with a rapid closure element or cover whereby the pressure container 1 may be efficiently pressure sealed upon completion of the filling. Simultaneously with the closing of opening 3, dilute sulfuric acid present in the pre-heater vessel 4 equipped with agitating means 4a, is lead via intake valve 5 and pipe 5a to pressure container 1. Upon the completion of the filling of the ingredients into pressure container 1, the exhaust valve 6 of autoclave exhaust line 6a is closed as well as the inlet valve 5. The sulfuric acid is passed through valve 8a and pipe 8b to pre-heater vessel 4 from a metering device 8. In device 8 the acid is weighed such that the desired quantity (depending upon the concentration) for the aluminum hydroxide will be available. Such acid may be conveniently heated to 30–50 degrees C. in pre-heater 4. The concentration of the acid is regulated to such an extent that the desired content of $Al_2O_3$ in the finished aluminum sulfate melt will be attained. It will be appreciated that the flow cross sections of the inlet line 5a containing the valve 5 and the exhaust line 6a containing the valve 6 are provided such that the acid from pre-heater 4 will completely pass to the pressure container 1 within 30–120 seconds. Immediately upon the completion of the acid addition, the inlet valve 5 and exhaust valve 6 will be closed and the stirrer 2 set in motion. According to the acid preheating temperature chosen, the reaction with the aluminum hydroxide starts after about 60–300 seconds from the completion of the acid addition whereby the temperature and pressure (i.e. autogenous pressure) in the autoclave or pressure container 1 recognizably increase. During the reaction, the temperature reaches and is maintained at about 165–180 degrees C. In order to effect the dissolution of slight residues of hydrate particles, it may be necessary to further stir the ingredients for a few minutes longer, to be quite safe about 10 minutes in all. At the termination of the reaction, the release or discharge valve 7 located in the bottom of pressure container 1 is opened and the contents are emptied. The further work up of the aluminum sulfate melt, produced in the foregoing manner, may be carried out in the conventional manner.

Of course, it is desirable to provide a weighing and metering device and container 10 for the aluminum hydroxide similar to the weighing and metering device and container 8 for the dilute sulfuric acid. To accommodate the device 10, a storage vessel 9 for aluminum hydroxide is disposed thereover so that aluminum hydroxide may pass, in turn, from vessel 9 through discharge means 9a to device 10 for weighing and metering and thereafter via worm 11 and spout 12 through inlet opening 3 into pressure container 1 for the desired reaction. Naturally, in place of aluminum hydroxide, bauxite may be employed in storage vessel 9 for reaction in pressure container 1 with the dilute sulfuric acid.

It will be appreciated that in accordance with the present invention, dry aluminum hydroxide may be used in place of wet aluminum hydroxide although in this instance the sulfuric acid must be correspondingly more diluted in order to arrive at the same $Al_2O_3$ concentration desired in the finished aluminum sulfate melt as is obtained with the use of wet or moist aluminum hydroxide. In the same manner, of course, bauxite in finely ground form, for example, of a particle size leaving a sieve residue of 20% on a DIN sieve 70 may be used.

In the production of aluminum sulfate with a higher content of $Al_2O_3$ than 18% by weight, higher decomposition temperatures are encountered than the usual temperature of about 165 degrees C. This is true since the reaction heat based upon the total mass present is greater even though the reaction heat based upon the $Al_2O_3$ present is the same. Naturally, the reverse condition will obtain where the production of aluminum sulfate with lower contents of $Al_2O_3$ than 17% by weight is contemplated. In such cases, it may be necessary to select an acid temperature above 35 degrees C. so that the temperature is sufficient for a total decomposition upon the liberation of the heat of reaction. Nevertheless, it will be appreciated that where acid temperatures above 35 degrees C. are employed, care must be taken with respect to the filling time for adding the sulfuric acid to the aluminum hydroxide in order to complete the acid addition before the reaction sets in. The filling time for the sulfuric acid may be decreased, of course, by providing correspondingly larger flow cross sections of the inlet valve and the connecting pipe between the acid preheater and the autoclave, such that, for example, where an acid temperature of 50 degrees C. is used, the filling will be completed within about 30 seconds.

Generally, commercially available aluminum sulfate has an $Al_2O_3$-content of 17–18%, although aluminum sulfates having a lower concentration of $Al_2O_3$ than 17% and a higher concentration than 18% are also used to some extent. Nevertheless, unlike the more commercially favorable aluminum sulfates, having 17–18% $Al_2O_3$, those having a lower content of $Al_2O_3$ entail the disadvantages of increased transportation costs since more water is present, and bad or only insufficient grindability. The grindability quality is of noteworthy significance since the aluminum sulfate which is obtained in larger chunks or blocks must thereafter be ground and screened to a suitable grain size for the specific purposes intended. This comminution and screening is only possible on a practical scale with aluminum sulfate having an $Al_2O_3$ content of above 17%, since the material shatters easily and does not stick nor adhere in the grinding and screening procedures. On the other hand, poor grinding and undesired sticking together of the particles occurs where aluminum sulfates having a lower content than 17% $Al_2O_3$ are treated. Indeed, aluminum sulfate having a higher content of $Al_2O_3$ than 18% suffer from the disadvantages that the material crystallizes poorly and very slowly and likewise possesses poor grinding qualities.

Due to the fact that upon emptying the aluminum sulfate melt from the autoclave, after the reaction has been completed, a certain pressure release will occur, a portion of the moisture present will evaporate. In this connecttion, the concentration of the melt and in turn of the $Al_2O_3$ content will increase. Therefore, in calculating the concentration of the sulfuric acid to be used, the loss of water by evaporation upon emptying of the autoclave must be taken into consideration or else the aluminum sulfate will possess a higher $Al_2O_3$ content than that desired.

In the production of neutral aluminum sulfate, 2 parts of $Al(OH)_3$ are charged per 3 parts of $H_2SO_4$. In practice, however, somewhat less than the theoretical quantity of sulfuric acid is preferably used for the formation of the aluminum sulfates, whereby the same possess a certain basicity degree. The degree of basicity indicates what percent of $SO_3$ is lacking in the basic aluminum sulfate in order to form a neutral aluminum sulfate. For example, a 1% basic aluminum sulfate signifies that a 100 kg. portion of aluminum sulfate contains 1 kg. less $SO_3$ than neutral aluminum sulfate. Aluminum sulfate having a basicity degree of up to 2% is still acceptably water soluble, but aluminum sulfate with a higher basicity degree does tend to hydrolysis in aqueous solution, whereby insoluble basic aluminum sulfates will be separated. In view of the general purposes for which aluminum sulfate is used, it is undesirable that insoluble material be present. Therefore, since higher basic aluminum sulfates will precipitate upon dissolution of the material in water, the finished aluminum sulfate is generally prepared with a basicity degree of no greater than 2%. However, in accordance with the present invention, it is possible to produce higher basic aluminum sulfates, where higher basic aluminum sulfates are to be used for some specific purpose as desired.

Depending upon the mol ratio of $Al_2O_3$ to $SO_3$ in the finished aluminum sulfate and the $Al_2O_3$ content therein, a specific quantity of bound water will be present. This water must be introduced into the mixture through the reaction components, i.e. the sulfuric acid and aluminum hydroxide and/or bauxite, considering the fact that in the pressure release of the contents from the autoclave, a specific quantity of water will evaporate. The amount of water which evaporates is generally in the order of about 4.0% of the finished aluminum sulfate. The artisan will appreciate that depending upon the total amount of water, including adhering water and water of constitution, which is present in the moist and/or dry aluminum hydroxide and/or bauxite used, the remainder of the necessary water must be added with the sulfuric acid. Where the sulfuric acid is present in concentrated form, or in moderately diluted form, the residual quantity of water necessary must be added by way of dilution of the acid. Nevertheless, it is also possible to contribute a partial quantity of this water of dilution to the reaction mixture with the alumina raw material, as for example in the form of water used to wash the aluminum hydroxide and/or bauxite when these materials are present in dried form.

The following examples are set forth for the purpose of illustrating the present invention, and it is to be understood that the invention is not to be limited thereby:

EXAMPLE 1

For the production of a 1.0% basic aluminum sulfate, having an $Al_2O_3$ content of 17.5%, 1500 kg. of moist aluminum hydroxide having a 15% moisture content, produced according to the Bayer process, are added to an autoclave having a capacity of 3500 liters. The moist aluminum hydroxide contains 823 kg. $Al_2O_3$, 452 kg. of water of hydration, and 225 kg. of adhering moisture. The necessary quantity of dilute sulfuric acid consists of 3400 kg. of 66.0% $H_2SO_4$ (specific weight 1.57 at 20 degrees C.). The acid is precisely weighed in a weighing vessel situated above the autoclave and then heated to 50 degrees C. prior to being added to the moist aluminum hydroxide. In this connection, after the moist aluminum hydroxide has been added to the autoclave, the inlet nozzle therefor is closed and an exhaust valve in the autoclave is opened so that the precisely weighed and preheated sulfuric acid may be readily added.

An inlet pipe for the acid into the autoclave is used having a diameter of 100 mm. such that the acid addition from the preheating container for the acid to the autoclave requires 100 seconds. The acid inlet pipe and the exhaust or vent valve are closed immediately whereby the autoclave is sealed. Then, the stirrer is switched on and after a further 100 seconds, the reaction begins.

The aluminum sulfate melt heats up within 80 seconds to 170 degrees C. and produces a pressure of 5.0 atmospheres excess pressure. After a stirring time of 12 minutes, the dissolution is completed, and the aluminum sulfate melt produced may be released into a storage container upon opening a bottom valve in the autoclave.

The aluminum sulfate discharged from the autoclave has an $Al_2O_3$ content of 17.5%, an insoluble residue amounting to 0.015% and is 1% basic. The $Al_2O_3$ yields amounts to 99.92%.

Of the moist aluminum hydroxide used as starting material (1500 kg.) 823 kg. were $Al_2O_3$ and 677 kg. were water (total). Of the sulfuric acid (66%–3400 kg.), 2244 kg. were $H_2SO_4$ and 1156 kg. were water. In the autoclave, the aluminum sulfate produced amounted to 4900 kg. having an $Al_2O_3$ content of 16.8%. Upon release of the aluminum sulfate from the autoclave, wherein 190 kg. of water evaporate, a yield of aluminum sulfate melt is obtained in the amount of 4710 kg. having a content of 17.5% $Al_2O_3$.

EXAMPLE 2

For the production of a 1.0% basic aluminum sulfate, having 16.0% of $Al_2O_3$, the procedure of Example 1 is followed. Thus, 1500 kg. of moist aluminum hydroxide having a 15% mosture content are added to the autoclave and thereafter the required 3860 kg. of dilute 58.5% sulfuric acid (specific weight 1.48 at 20 degrees C.) are added. The acid is preheated to 50 degrees C. prior to addition to the aluminum hydroxide in the autoclave. The introduction of the acid lasts about 110 seconds, and on the basis of the use of a more dilute sulfuric acid than in Example 1, the time until the reaction initiates is somewhat longer, namely about 150 seconds after the completion of the introduction of the acid. The aluminum sulfate melt heats up to 160 degrees C. at a pressure of 4.2 atmospheres excess pressure. The stirring time amounts to 12 minutes as in Example 1.

The aluminum sulfate which is discharged from the autoclave upon completion of the reaction contains 16% $Al_2O_3$, 0.010% of insoluble residues, and is 1% basic.

Of the 1500 kg. of moist aluminum hydroxide used, 823 kg. represent $Al_2O_3$ and 677 kg. represent water (total). Of the 3860 kg. of 58.5% sulfuric acid used, 2244 kg. represents $H_2SO_4$ and 1616 kg. represent diluting water. The aluminum sulfate melt in the autoclave amounts to 5360 kg. having an $Al_2O_3$ content of 15.3%. After release of the aluminum sulfate from the autoclave, in which 120 kg. of water evaporate, 5140 kg. of aluminum sulfate are obtained having an $Al_2O_3$ content of 16.0%.

EXAMPLE 3

Into an autoclave having a capacity of 3500 liters 1200 kg. of dry and ground bauxite are added, the bauxite having the following analysis:

|  | Percent |
|---|---|
| $Al_2O_3$ | 60.6 |
| $Fe_2O_3$ | 1.5 |
| $TiO_2$ | 1.6 |
| $SiO_2$ | 3.0 |
| $H_2O$ | 32.0 | and a residue of 1.3% including $Cr_2O_3$, $V_2O_5$, $Mn_2O_3$, $P_2O_5$, etc. The particles had a grain size representing a grinding fineness of 16.5% residue on a 0.05 mm. opening sieve.

In the sulfuric-acid-weighing-vessel, 3030 kg. of dilute sulfuric acid (66.1%) are weighed and heated to 45 degrees C. Three mols of $H_2SO_4$ are charged per mol of $Al_2O_3$. The $Fe_2O_3$-constituent of the bauxite is disregarded in the acid charging since the $Al_2O_3$ is decomposed up to only about 97 to 98% and thus sufficient sulfuric acid is still available for the production of a 1% basic aluminum sulfate having an $Al_2O_3$ content of 17.5%.

As in Example 1, the dilute sulfuric acid is added to the bauxite already present in the autoclave. The adding time of the acid amounts to 90 seconds, and after a further 70 seconds, the reaction starts and the reaction mass heats up to 172 degrees C., the pressure in the autoclave building up to 4.2 atmospheres excess pressure at this temperature. After 12 minutes stirring time, the decomposition is finished, and the aluminum sulfate is released into a storage container as in the preceding examples.

Of the amount of bauxite charged (1200 kg.), 726 kg. of $Al_2O_3$ were present, 707 kg. thereof being soluble. Of the 3030 kg. of 66.1% sulfuric acid used, 2000 kg. were $H_2SO_4$ and 1030 kg. represented diluting water. The aluminum sulfate melt in the autoclave amounted to 4230 kg. having an $Al_2O_3$ content of 16.8% while the aluminum sulfate after the release of water, in accordance with the procedure of the foregoing examples, amounted to 4050 kg. having an $Al_2O_3$ content of 17.5%. The aluminum sulfate yield contained an $Fe_2O_3$ content of 0.5% and an insoluble residue content of 2.2%, in addition to the $Al_2O_3$ content of 17.5%. In the insoluble residue, 22.1% $Al_2O_3$ was present, so that a yield of water-soluble $Al_2O_3$ of over 97% was obtained.

Thus, it is apparent that the time required for the mixing of the aluminum hydroxide and sulfuric acid must be less than the time in which the reaction initiates between the two components. If, as described in Example 1, the acid has a temperature of 50 degrees C., the acid concentration amounts to 66.0% and a moist aluminum hydroxide is used having 45.1% total water, then the reaction will start after 200 seconds calculated from the introduction of the acid. The mixing procedure must be completed, therefore, within less than 200 seconds and appropriately in about 100 seconds. On the other hand, if instead of an acid having a temperature of 50 degrees C., an acid is used having a temperature of 65 degrees C., then the interval between the introduction of the acid and the setting in of the reaction will amount to about 40 seconds. In this case, the acid must be mixed appropriately with the aluminum hydroxide in less than 30 seconds for optimum results.

What is claimed is:

1. Process for the production of aluminum sulfate melt having a content of from about 14 to 20% by weight of $Al_2O_3$ by the reaction under pressure of aluminum hydroxide with sulfuric acid having a concentration corresponding to the desired $Al_2O_3$ content in the produced aluminum sulfate melt which comprises combining sulfuric acid, which has a concentration corresponding to such desired $Al_2O_3$ content in the aluminum sulfate melt to be produced, at a temperature of between about 30 and 50 degrees C. with aluminum hydroxide in a reaction zone over a period of from about 30 to 120 seconds, intensively completely intermixing the aluminum hydroxide with the sulfuric acid immediately after said combining for a period of about 60 to 300 seconds until the exothermic reaction is initiated, and thereafter carrying out the reaction of the mixture of aluminum hydroxide and sulfuric acid in said reaction zone under autogenous pressure while maintaining the temperature of the reaction mixture within the range of from about 150 to 200 degrees C. and continuing the intensive intermixing, the intensive intermixing being continued throughout the reaction and being carried out for a period of about at least 10 and at most 60 minutes.

2. Process according to claim 1 wherein the sulfuric acid being combined is added to the aluminum hydroxide which is already situated in solid form in said reaction zone, the intensive intermixing is carried out for a period of at most 30 minutes, and the reaction mixture is maintained at a temperature between about 165 and 180 degrees C. during the reaction.

3. Process according to claim 1 wherein at least a portion of the aluminum hydroxide used is replaced by finely ground bauxite.

4. In the process for the production of aluminum sulfate melt having a content of from about 14 to 20% by weight of $Al_2O_3$ by reacting, under pressure, aluminum hydroxide with sulfuric acid having a concentration corresponding to the desired $Al_2O_3$ content in the produced aluminum sulfate melt, the improvement which comprises combining sulfuric acid maintained at a temperature between about 30 to 50 degrees C. over a period of from about 30 to 120 seconds with aluminum hydroxide, intensively intermixing the combined reactants for a period of from about 60 to 300 seconds until the exothermic reaction is initiated, maintaining the reaction temperature between about 165 and 180 degrees C. and continuing the intensive intermixing of the reaction mixture for about an additional 10 minutes.

5. Improvement according to claim 4 wherein at least a portion of the aluminum hydroxide used is replaced by finely ground bauxite.

6. Process according to claim 2 wherein after the reaction has been completed, evaporation of a part of the water present is effected upon release of the pressure of the reaction zone at the reaction temperature.

References Cited by the Examiner
UNITED STATES PATENTS

| 191,160 | 8/1876 | Lennig | 23—123 |
| 2,332,285 | 10/1943 | Wilson | 23—123 |

FOREIGN PATENTS

| 269,174 | 9/1927 | Great Britain. |

MAURICE A. BRINDISI, *Primary Examiner.*